(12) United States Patent
Toda

(10) Patent No.: US 9,381,969 B2
(45) Date of Patent: Jul. 5, 2016

(54) BODY FRAME FOR A SADDLE-TYPE VEHICLE, AND VEHICLE INCLUDING SAME

(71) Applicant: HONDA MOTOR CO., LTD., Minato-Ku, Tokyo (JP)

(72) Inventor: Munehiro Toda, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/339,602

(22) Filed: Jul. 24, 2014

(65) Prior Publication Data

US 2015/0035249 A1 Feb. 5, 2015

(30) Foreign Application Priority Data

Jul. 31, 2013 (JP) ................................. 2013-159985

(51) Int. Cl.
| | |
|---|---|
| *B62K 11/02* | (2006.01) |
| *B62K 11/04* | (2006.01) |
| *B62K 19/12* | (2006.01) |
| *B62K 19/32* | (2006.01) |

(52) U.S. Cl.
CPC ................. *B62K 11/04* (2013.01); *B62K 19/12* (2013.01); *B62K 19/32* (2013.01)

(58) Field of Classification Search
CPC ...................................................... B62K 11/04
USPC ..................... 180/219; 280/274, 281.1, 288.2
See application file for complete search history.

(56) References Cited

U.S. PATENT DOCUMENTS

| | | | | |
|---|---|---|---|---|
| 6,481,522 | B1* | 11/2002 | Adachi .................. | B62K 11/04 180/219 |
| 7,677,346 | B2 | 3/2010 | Suzuki | |
| 2004/0182634 | A1* | 9/2004 | Adachi .................. | B62K 11/04 180/312 |
| 2006/0157955 | A1* | 7/2006 | Kurokawa et al. ............ | 280/279 |
| 2008/0258422 | A1* | 10/2008 | Suzuki .................. | B62K 11/04 280/274 |

FOREIGN PATENT DOCUMENTS

JP 2008-230416 A 10/2008

* cited by examiner

*Primary Examiner* — Jacob Knutson
(74) *Attorney, Agent, or Firm* — Carrier Blackman & Associates, P.C.; William D. Blackman; Joseph P. Carrier

(57) ABSTRACT

A forged head pipe for a motorcycle frame is integrally formed and includes a main frame attachment portion, a pipe portion, and a lower extension extending downwardly from the pipe portion. A down frame attachment portion is provided on the lower extension, and is spaced away from the main frame attachment portion and the pipe portion. A down frame is welded to the down frame attachment portion by contacting the same without inserting the same. The down frame attachment portion is configured from a connecting portion, extending in parallel to the pipe portion, and an extension extending rearwardly from a lower end portion of the connecting portion. By eliminating an insertion socket, manufacturing cost is reduced, and welding quality is improved by spacing the down frame downwardly below the main frame attachment portion and the pipe portion, to which a high load is applied.

16 Claims, 6 Drawing Sheets

BODY FRAME FOR A SADDLE-TYPE VEHICLE, AND VEHICLE INCLUDING SAME

CROSS-REFERENCE TO RELATED APPLICATIONS

The present invention claims priority under 35 USC 119 based on Japanese Patent Application No. 2013-159985, filed on Jul. 31, 2013. The entire subject matter of this priority document, including specification claims and drawings thereof, is incorporated by reference herein.

BACKGROUND OF THE INVENTION

1. Field of the Invention

The present invention relates to a vehicle body frame for a saddle-type vehicle such as a motorcycle, and particularly to a vehicle body frame having an improved structure of a head pipe provided at a front end portion of the vehicle body frame. The present invention also relates to a saddle-type vehicle incorporating the described vehicle body frame.

2. Description of the Background Art

A conventional vehicle body frame for a motorcycle is known, which includes a head pipe which pivotally supports a steering shaft at a front end portion thereof. Main frame attachment portions are provided at left and right upper portions of a rear portion of the head pipe, and front end portions of main frames provided in a left and right pair are welded to these attachment portions. A down frame attachment portion is provided integrally in a downwardly neighboring relationship with each of the main frame attachment portions, and a front end portion of a down frame is welded to the down frame attachment portion. Also it is known that the head pipe is formed by forging.

Such a known type of vehicle body frame is disclosed, for example, in published Japanese Patent Application No. 2008-230416.

Since high strength and low weight are required for the head pipe which is a portion for suspending a front wheel suspension, the head pipe is sometimes forged from an aluminum alloy or the like. In this case, since the main frame attachment portion is a high-load portion to which a higher load is applied, than that applied to the front wheel, high strength is required. High strength is also required for the down frame attachment portion neighboring with the main frame attachment portion.

Therefore, in the conventional vehicle frame, after the head pipe is forged, an insertion portion having a recessed groove shape is formed by mechanical working of the down frame attachment portion, and a front portion of the down frame is fitted into the insertion portion to secure a long fitting length. Then, the fitted portion is welded to form a long welding distance.

However, if the insertion portion having the long fitting length is formed in this manner, then the mechanical working becomes complicated and the number of working steps increases, and also the working time increases. Therefore, the cost of mechanical working increases. Further, the cost for the welding increases as the welding distance increases. Further, in order to integrate the main frame attachment portion and the down frame attachment portion with each other, it is necessary to increase the size of the head pipe. However, since the material waste which is removed by the mechanical working increases, the amount of required material increases, which increases the material cost. Accordingly, a structure which does not cause such increase of the cost is demanded.

Further, since the down frame attachment portion neighbors with the main frame attachment portion which is a high-load portion, the welding quality of the down frame attachment portion has a significant influence on the strength. Especially, if a double bead at which a welding portion of the main frame attachment portion and a welding portion of the down frame attachment portion overlap with each other occurs, then the stability of the welding quality is lost.

Therefore, a need exists for an improved head pipe structure which does not depend upon the welding quality.

SUMMARY OF THE INVENTION

Reference numbers are included in the following description corresponding to the reference numbers used in the drawings. Such reference numbers are provided for purposes of illustration, and are not intended to limit the invention.

In order to solve the problem described above, a first aspect of the present invention provides a vehicle body frame for a saddle-type vehicle including a head pipe (11) which supports a front wheel, a pair of left and right main frames (20) connected to the head pipe and extending rearwardly in leftward and rightward directions, and a down frame (21) connected to the head pipe (11) and extending downwardly, the head pipe (11) having a pipe portion (40), a main frame attachment portion (44) to which the main frame (20) is welded at a front end portion thereof such that part of the main frame (20) overlaps with the pipe portion (40), and a down frame attachment portion (50) to which the down frame (21) is welded at an upper end portion thereof, the head pipe (11) having a downward extension (45) extending downwardly from the pipe portion (40) and the main frame attachment portion (44), the down frame attachment portion (50) being provided at a lower portion of the downward extension (45).

According to a second aspect of the invention, the vehicle body frame for the saddle-type vehicle according to the first aspect is configured such that the down frame attachment portion (50) is disposed rearwardly downwardly of the main frame attachment portion (44) in a spaced relationship from the pipe portion (40) and the main frame attachment portion (44).

According to a third aspect of the invention, the vehicle body frame for the saddle-type vehicle according to the first aspect is configured such that the downward extension (45) includes an upper side supporting portion (51) extending rearwardly downwardly from a lower portion of the main frame attachment portion (44) and a lower side supporting portion (53) extending rearwardly downwardly from a lower portion of the pipe portion (40), and is formed integrally with the head pipe (11) by forging, and the down frame attachment portion (50) is configured from a connecting portion (54) extending in parallel to the pipe portion (40) from a lower end of the upper side supporting portion (51) and connecting to the lower side supporting portion (53) and an extension (55) extending rearwardly from the lower side supporting portion (53) farther than a lower end portion of the connecting portion (54).

According to a fourth aspect of the invention, the vehicle body frame for the saddle-type vehicle according to the third aspect is configured such that the down frame (21) contacts and is welded at end faces (21a, 21b) at an upper end portion thereof with and to the connecting portion (54) and the extension (55) of the down frame attachment portion (50).

According to a fifth aspect of the invention, the vehicle body frame for the saddle-type vehicle according to the third or fourth aspect is configured such that the down frame attachment portion (50) is formed by mechanical working in the vehicle widthwise direction so that each of a rear face of the connecting portion (54) and an upper face of the extension (55) is included in a plane which exhibits a straight line as viewed in side elevation.

Effects of the Invention

With the invention according to the first aspect, the downward extension extending downwardly from the pipe portion and the main frame attachment portion is provided and the down frame attachment portion is provided at the lower portion of the downward extension. Therefore, it is possible to dispose the down frame attachment portion in a downwardly spaced relationship from the main frame attachment portion and hence from the pipe portion to which a high load is applied. Consequently, the necessity to provide a fitting recessed portion on a head pipe and provide an insertion shape for fitting with the fitting recessed portion can be eliminated.

As a result, mechanical working after forging can be reduced, and besides, since material waste to be removed by mechanical working is reduced, reduction in cost can be anticipated.

Further, by disposing the down frame attachment portion in a spaced relationship from the pipe portion to which a high load is applied, coupling strength which does not rely upon the welding quality can be obtained. Further, by disposing the down frame attachment portion in a spaced relationship from the main frame attachment portion, the welding quality can be improved.

Besides, if an amount of forming material is equal, then the head pipe can be increased in size by an amount by which the material waste to be removed decreases.

With the invention according to the second aspect, since the integral lower extension is provided on the head pipe, the down frame can be reduced in length.

With the invention according to the third aspect, the upper portion of the lower extension is configured as the upper side supporting portion extending downwardly from the main frame attachment portion and the lower portion of the lower extension is configured as the lower side supporting portion extending downwardly from the pipe portion, and they are formed integrally with each other. Further, the down frame attachment portion is configured from the connecting portion which extends in parallel to the pipe portion from the lower end of the upper side supporting portion and connecting to the lower side supporting portion and the extension extending rearwardly from the lower side supporting portion farther than the lower end portion of the connecting portion. Therefore, the down frame can be coupled only by welding the contacting portion merely through the contact without using an insertion shape for fitting the down frame. Accordingly, while the structure of the down frame attachment portion is simplified, a welding distance of a required length can be assured.

With the invention according to the fourth aspect, since an insertion shape is not used, the overlap between the lower extension of the head pipe and the down frame can be reduced to reduce the weight of the vehicle body frame.

With the invention according to the fifth aspect, the mechanical working for the down frame attachment portion merely involves mechanical working of the connecting portion and the extension in the vehicle widthwise direction so that each of the rear face of the connecting portion and the upper face of the extension may be included in a plane which exhibits a straight line as viewed in side elevation. Therefore, the mechanical working can be minimized, and the machining time and the material cost for the formation materials can be reduced to achieve reduction of the cost.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF ILLUSTRATIVE EMBODIMENTS

An illustrative embodiment of the present invention will be described herein in detail, with reference to the accompanying drawings. Throughout this description, relative terms like "upper", "lower", "above", "below", "front", "back", and the like are used in reference to a vantage point of an operator of the vehicle, seated on the driver's seat and facing forward. It should be understood that these terms are used for purposes of illustration, and are not intended to limit the invention.

Figure 1:
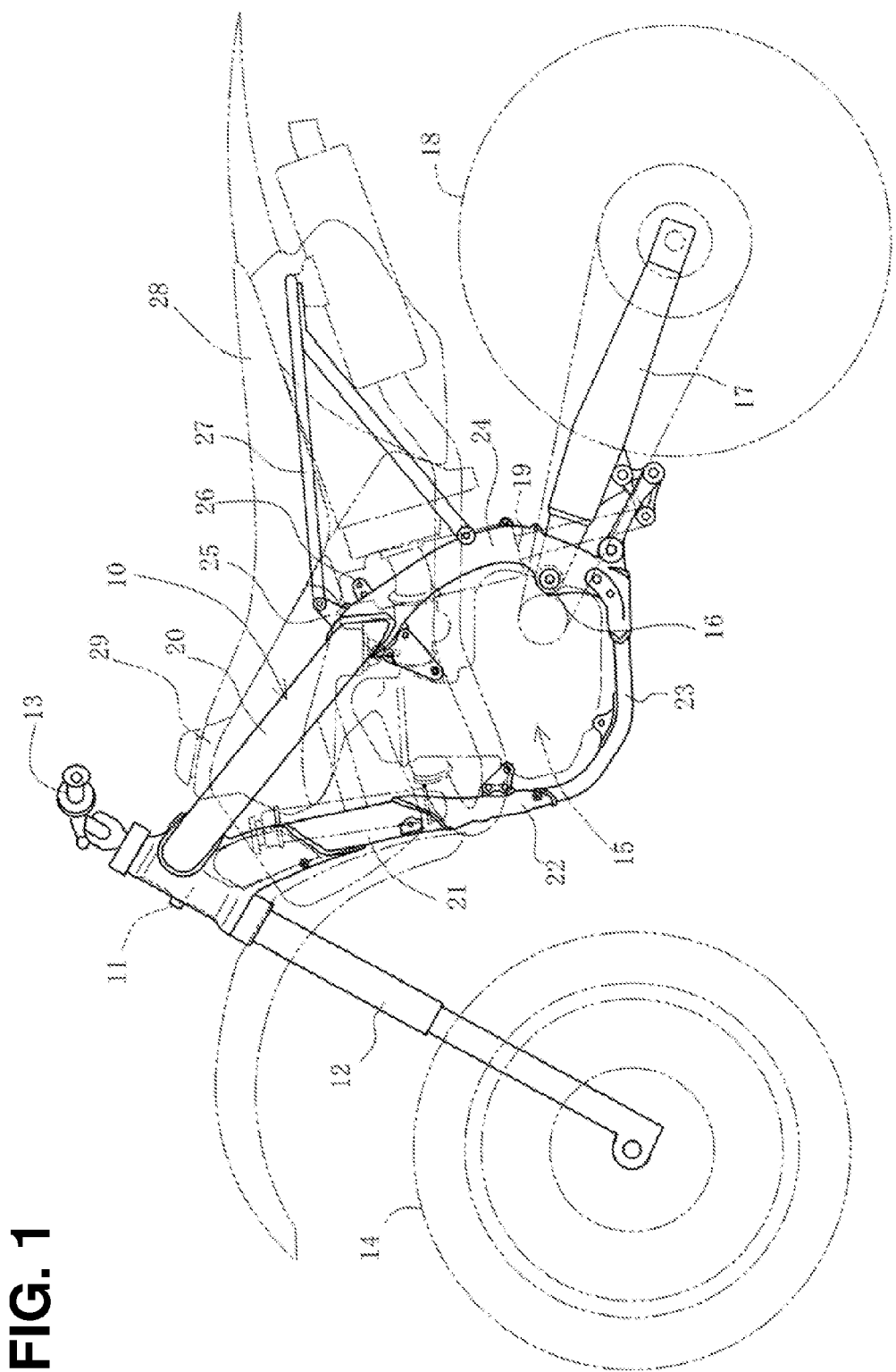
FIG. 1 is a left side elevational view of a motorcycle to which a vehicle body frame according to the present invention is applied.

In the following, an embodiment is described with reference to the drawings. Referring to FIG. 1, in a motorcycle, a front fork 12 is pivotally supported, at an upper end thereof, on a head pipe 11 provided at a front end portion of a vehicle body frame 10. The front fork 12 is turned by grasping a handle bar 13 to steer a front wheel 14 supported at a lower end of the front fork 12. In the depicted embodiment, the front fork 12 is a long-stroke type front fork designed and configured for off-road riding.

The vehicle body frame 10 has a closed-loop shape as viewed in side elevation, which supports an engine 15 in the loop, and also supports a front end of a rear fork 17, which is configured as a swing arm for rocking motion on a pivot shaft 16 provided at a rear portion of the vehicle body frame 10.

A rear wheel 18 is supported at a rear end portion of the rear fork 17, and a rear shock absorber 19 of a rear suspension is provided between an intermediate portion of the rear fork 17 in the forward and rearward direction and a rear side upper portion of the vehicle body frame 10. The rear wheel 18 is driven by the engine 15 through a chain.

The vehicle body frame 10 is configured from a pair of spaced-apart main frame sections 20, a down frame section 21, a lower frame section 23, and a pivot frame section 24. The main frame sections 20 extend from a front end portion thereof, attached to the head pipe 11, obliquely downwardly and rearwardly below the main frame sections 20 and above the engine 15. The down frame section 21 extends from the head pipe 11 obliquely downwardly and rearwardly, at a steep angle, to an area in front of the engine 15.

The lower frame section 23 is connected to the down frame section 21 through a bracket 22, welded to a lower end portion of the down frame section 21, and the lower frame section extends rearwardly, passing below the engine 15.

The pivot frame section 24 extends in the upward and downward direction and connects the rear end portions of the main frame sections 20 and the lower frame section 23 to each other. The pivot shaft 16 is supported on the pivot frame section 24.

At a lower end portion of each main frame section 20, a stay 25 is provided, and a shock absorber bracket 26 is provided in the proximity of the rear side of the stay 25. A pair of seat rails 27 are supported at a front end portion thereof on the stay 25, and the seat rails extend obliquely upwardly and rearwardly. A seat 28 is supported on the seat rails 27.

A fuel tank 29 is disposed in front of the seat 28 and supported on the main frame sections 20. The rear shock absorber 19 is supported at an upper end thereof on the shock absorber bracket 26.

Figure 2:
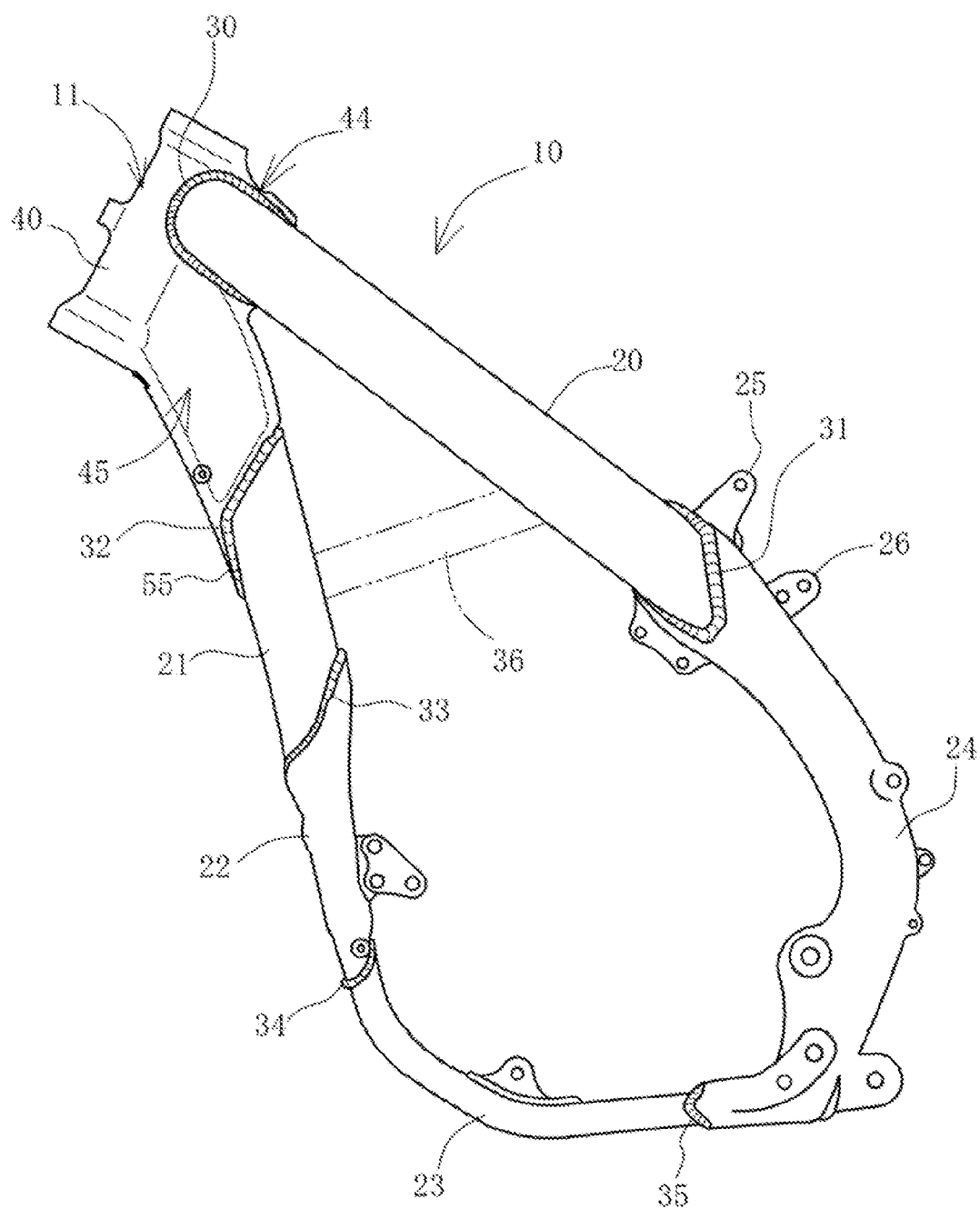
FIG. 2 is a left side elevational view of the vehicle body frame of FIG. 1.

In the following, a detailed structure of the vehicle body frame 10 is described. As depicted in FIG. 2, each main frame section 20 is configured from pipe members made of light alloy such as aluminum and provided in left and right pair. The main frame section 20 is welded and integrated at a front end portion thereof to and with rear side upper side faces of the head pipe 11. Reference symbol 30 denotes a main frame weld seam, along which the head pipe 11 and the front end portion of the main frame section 20 are welded.

The main frame section 20 is welded and integrated also at the rear end thereof to and with the front end portion of the pivot frame section 24 along a weld seam 31. The pivot frame section 24 is a cast product or a forged product made of light alloy such as aluminum.

Figure 4:
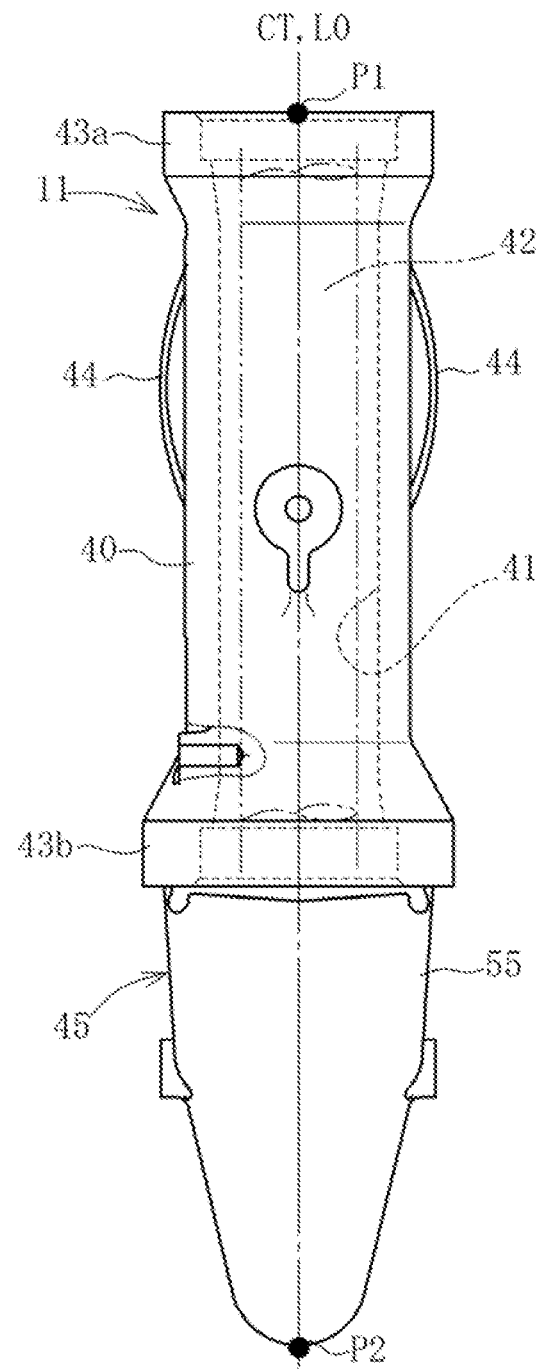
FIG. 4 is a front elevational view of the head pipe.
Figure 5:
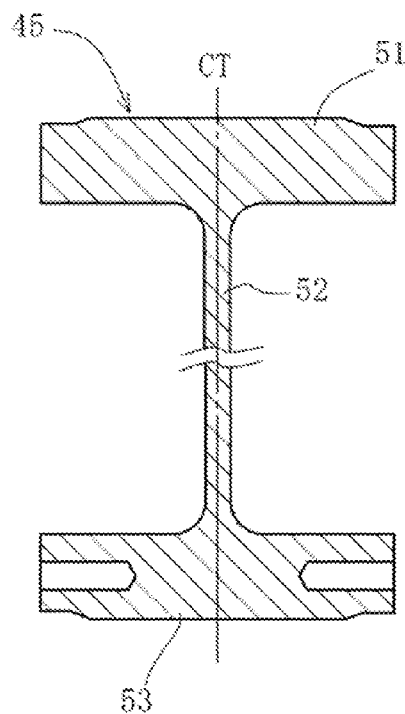
FIG. 5 is a sectional view taken along line 5-5 of FIG. 3.

The down frame section 21 is a single pipe member made of light alloy such as aluminum and provided in the upward and downward direction along a vehicle body central longitudinal plane CT (FIGS. 4 and 5). The down frame section 21 is comparatively short and is an extruded product made of light alloy such as aluminum. It is to be noted, however, that the down frame section 21 is not formed by swaging working into a taper shape, as in a conventional product, but instead, is formed into a straight shape with which the cross section thereof does not vary in the lengthwise direction.

The down frame section 21 is welded and integrated at an upper end thereof to and with a rear lower portion of the head pipe 11 along a down frame weld seam 32. The down frame weld seam 32 is positioned downwardly and slightly rearwardly in a separated relationship from the main frame weld seam 30.

The down frame section 21 is welded and integrated at a lower end portion thereof to and with an upper end portion of the bracket 22 along a weld seam 33.

The bracket 22 is configured from a cast product or the like made of light alloy such as aluminum and is bifurcated in the leftward and rightward directions at a lower portion thereof. The paired left and right lower frame sections 23 are welded and integrated at a front end portion thereof to and with a lower end of the bracket 22 along a weld seam 34.

The left and right lower frame sections 23 are welded and integrated at a rear end portion thereof to and with a lower end portion of the pivot frame section 24 along a weld seam 35.

Now, details of the head pipe 11 are described. The head pipe 11 is a forged product made of light alloy such as aluminum and has a pipe portion 40, a main frame attachment portion 44, and a downward extension 45 integrally formed thereon.

Figure 3:
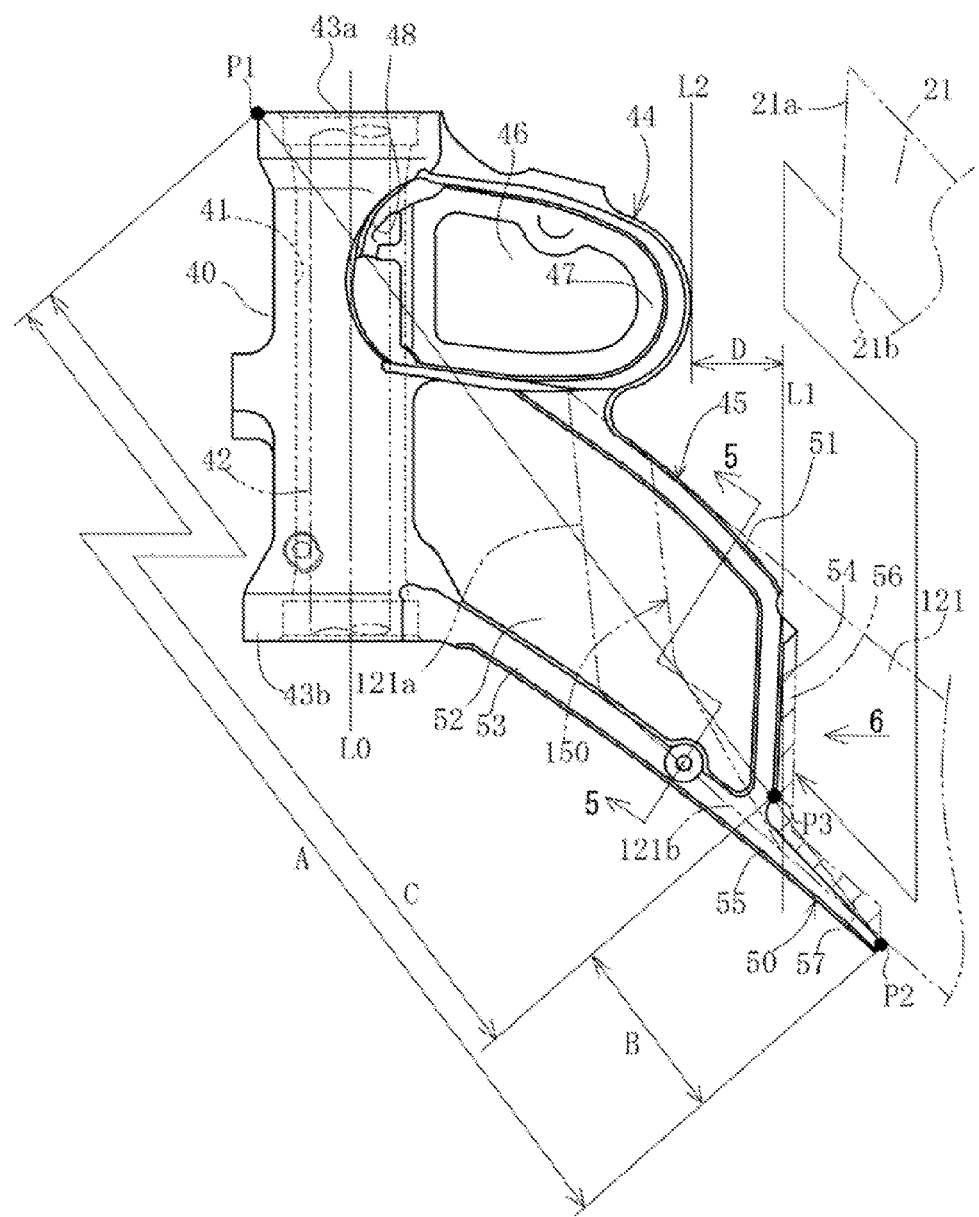
FIG. 3 is a left side elevational view of a head pipe of FIG. 2.

As depicted in FIGS. 3 and 4, the pipe portion 40 is formed in the upward and downward direction at a front portion of the head pipe 11, and a shaft hole 41 is provided in the inner side of the pipe portion 40 and extends in the upward and downward direction through the pipe portion 40. A steering shaft 42 is inserted in and supported by the shaft hole 41.

Bearing holder portions 43a and 43b are provided at upper and lower portions of the pipe portion 40, and the shaft hole 41 is increased in diameter thereof at the bearing holder portions 43a and 43b. A bearing (not shown) is fitted in each of the bearing holder portions 43a and 43b and supports the steering shaft 42 thereon.

The pipe portion 40 of the head pipe 11 continues at the rear side thereof to the main frame attachment portion 44, and also to the downward extension 45, below the main frame attachment portion 44. The main frame attachment portion 44 and the downward extension 45 each extend respectively rearwardly from the pipe portion 40. The downward extension 45 extends obliquely rearwardly and downwardly from the pipe portion 40 and from the main frame attachment portion 44.

The main frame attachment portion 44 overlaps at part (front end portion) thereof with the pipe portion 40, and is expanded in the leftward and rightward direction of the pipe portion 40 (FIG. 4). A cutout opening 46 is provided in the main frame attachment portion 44 such that it extends therethrough in a vehicle width direction. Further, the left and right end faces 47 of the main frame attachment portion 44 each form a continuous surface up to recessed portions 48 formed on the side face upper portion rear side of the pipe portion 40. The front end portion inner face sides of the upper frame portions 20 contact with the left and right end faces 47, respectively, and the periphery of the contacting portions is fillet-welded. The welded portions configure the main frame weld seam 30.

As seen best in FIG. 3, the downward extension 45 is provided on the head pipe 11 below the main frame attachment portion 44, and has a shape resembling a modified parallelogram as viewed in side elevation. A rear portion of the downward extension 45 is formed so as to extend rearwardly longer than the main frame attachment portion 44. A rear end portion of the downward extension 45 is configured from a connecting portion 54 and an extension 55 extending further rearwardly from the connecting portion 45. Further, the rear end portion of the downward extension 45 configures a down frame attachment portion 50 having a substantially L shape as viewed in side elevation.

As depicted in FIG. 5, the downward extension 45 has an upper side supporting portion 51, an upright wall 52, and a lower side supporting portion 53 and has a cross section of a substantially H shape. The upper supporting portion 51 is formed in a plane extending obliquely downwardly rearwardly from a lower portion of the main frame attachment portion 44. The lower side supporting portion 53 is formed in a plane extending obliquely downwardly rearwardly from the pipe portion 40.

The upper side supporting portion 51 and the lower side supporting portion 53 are connected to each other by the upright wall 52 extending in the forward and rearward direction and are forged integrally with the head pipe 11. The upright wall 52 has lightening recessed portions formed on the sides thereof, by which the formation material of the downward extension 45 is reduced.

Figure 6:
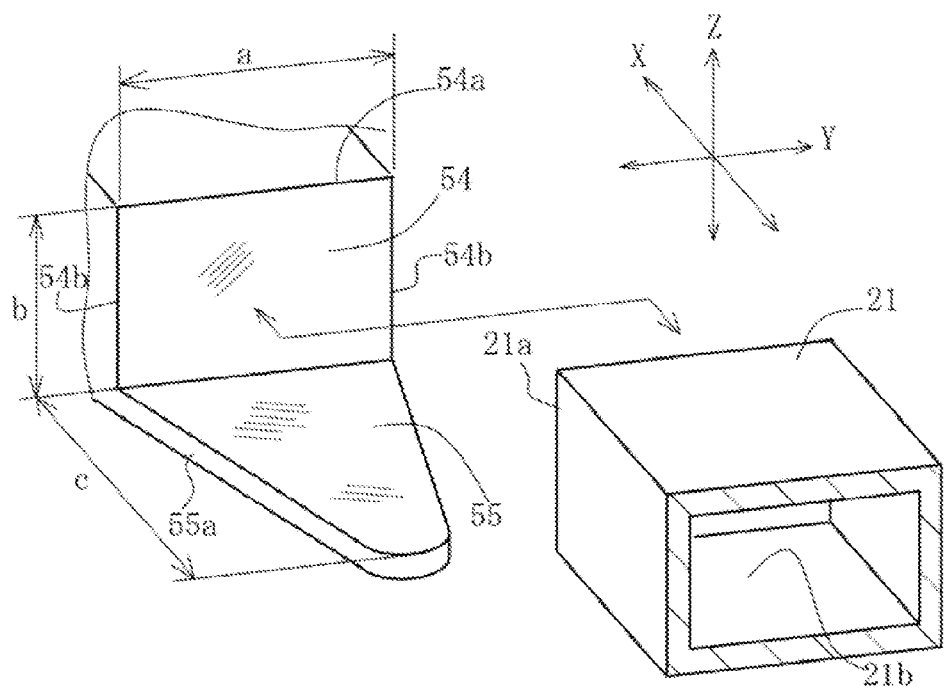
FIG. 6 is a perspective view schematically depicting a down frame attachment portion.

The upper side supporting portion 51 continues at a rear end portion thereof to the connecting portion 54. The connecting portion 54 is formed in a plane extending in parallel to the pipe portion 40 and spread in the upward and downward direction and the vehicle widthwise direction. The connecting portion 54 is connected at a lower end portion thereof to a rear end portion of the lower side supporting portion 53. As depicted in FIG. 6, the down frame section 21 contacts at an upper end face 21a thereof with the connecting portion 54.

The extension 55 is a portion of the lower side supporting portion 53 which is extended rearwardly farther than a lower end portion of the connecting portion 54 and has a planar shape as viewed from above. The down frame section 21 contacts at an upper end lower face 21b thereof with the extension 55.

Further, the extension 55 has a downwardly tapering tongue shape as viewed in front elevation depicted in FIG. 4.

Reference symbol 56 indicated by an imaginary line in FIG. 3 denotes a connecting portion side machined portion, and 57 denotes an extension side machined portion. Both portions are excess thickness portions upon forging in order to assure a necessary draft when the head pipe 11 is forged, and they are cut away by mechanical working after forging.

This mechanical working is carried out from a side (Y direction in FIG. 6) of the head pipe 11, and a rear face of the connecting portion 54 and an upper face of the extension 55 are formed in such flat faces which individually form a straight line as viewed in side elevation.

Besides, since the portions which are removed by the mechanical working are unnecessary thickness portions for a draft, the portions to be removed is as small in amount as possible. Accordingly, the mechanical working is carried out rapidly and easily and also the material waste is reduced.

Further, the angles of the connecting portion 54 and the extension 55 after the mechanical working are adjusted to angles necessary for contact by an upper end portion of the down frame section 21.

Further, the position of the connecting portion 54 is disposed in a spaced relationship downwardly and rearwardly from the main frame attachment portion 44 and the pipe portion 40.

If, as viewed in side elevation, the axis of the shaft hole 41 (axial line of the steering shaft 42) is represented by L0, a line extending in parallel to the straight line L0 and passing a rear end of the connecting portion 54 is represented as rear upright wall rear end line L1, and a line extending in parallel to the straight line L0 and passing a rear end of the main frame attachment portion 44 is represented as main frame attachment portion rear end line L2, then a distance denoted by D exists between the rear upright wall rear end line L1 and the main frame attachment portion rear end line L2.

In particular, the connecting portion 54 is spaced rearwardly by the distance D from the main frame attachment portion 44, and also the extension 55 is inevitably spaced rearwardly by a distance greater than the distance D from a rear end of the main frame attachment portion 44. Consequently, the main frame attachment portion 44 and the pipe portion 40 welded to the main frame section 20 and the down frame attachment portion 50 to which the down frame section 21 is welded are separated from each other.

Therefore, the down frame weld seam 32 of the down frame attachment portion 50 formed along the connecting portion 54 and the extension 55 is formed independently of, and at a position spaced apart from the main frame weld seam 30, without continuing to the main frame weld seam 30.

Further, since the down frame weld seam 32 is spaced also from the pipe portion 40 to which a high load is inputted from the front wheel 14, it is spaced rearwardly by a great distance from the high load point.

An imaginary line 121 depicted in the figure denotes a conventional down frame, and an upper end portion thereof reaches a lower portion of the main frame attachment portion 44 while a weld seam thereof neighbors with a weld seam of the main frame section 20 thereby to form a double bead.

Further, a down frame attachment portion 150 downwardly neighbors with the main frame attachment portion 44 and has a fitting recessed portion of a substantially channel-shaped cross sectional shape formed thereon (refer to FIG. 7) such that an upper end portion of the down frame 121 is inserted and fitted into and welded to the fitting recessed portion along a periphery of the same.

As depicted in FIG. 6, the connecting portion 54 and the extension 55 form a plane bent in a substantially L shape. The down frame section 21 abuts at an upper end face 21a thereof with the connecting portion 54 and is placed at an upper end lower face 21b thereof on the extension 55, which is welded along the contacting portion thereof. This welding is carried out in the leftward and rightward direction (direction indicated by an arrow mark Y) along an upper end 54a of the connecting portion 54, in the upward and downward direction (direction indicated by an arrow mark Z) along side ends 54b of the connecting portion 54 and substantially in the forward and rearward direction (direction indicated by an arrow mark X) along a periphery 55a of the extension 55.

Accordingly, the length of the down frame weld seam 32 is configured from a length a along the upper end 54a of the connecting portion 54, a length b along the side ends 54b of the connecting portion 54, and a length c along the periphery 55a of the extension 55 (b and c are indicated at only one side).

Now, operation is described. If the head pipe 11 is produced by forging, then it is placed into a state in which a connecting portion side machining portion 56 and an extension side machining portion 57 are left as depicted in FIG. 3. Therefore, if the connecting portion side machining portion 56 and the extension side machining portion 57 are machined in directions from the left and the right by mechanical working, then a finished product is obtained. At this time, the head pipe 11 is worked such that the rear face of the connecting portion 54 forms a single flat face as viewed from the rear and also the upper face of the extension 55 forms a single flat face as viewed from above.

Then, front end portions of the left and right main frame sections 20 are placed on the left and right end faces 47 and the front ends are adjusted to the recessed portions 48, and the peripheries thereof are fillet-welded to form the main frame weld seams 30.

Similarly, the down frame section 21 contacts at the upper end face 21a thereof with the rear face of the connecting portion 54 while it contacts at the upper end lower face 21b thereof with the upper face of the extension 55 and then the periphery thereof is fillet-welded. The down frame weld seam 32 is formed thereby (FIG. 2).

At this time, since the down frame section 21 is not coupled in an insertion shape to the lower extension 45 of the head pipe 11, the overlap between the lower extension 45 and the down frame section 21 can be reduced to reduce the weight of the vehicle body frame.

Further, since the main frame attachment portion 44 and the down frame attachment portion 50 are separated from each other and the welded portion is displaced rearwardly by the distance D from the rear end of the main frame attachment portion 44, the down frame weld seam 32 can be formed at a position spaced rearwardly from the pipe portion 40 which is a high load portion to which a load from the front wheel 14 is inputted. Therefore, the coupling portion of the head pipe 11 and the down frame section 21 can be formed in a coupling structure of a high strength which does not rely upon the welding quality.

Moreover, since the required strength for the welding portion of the down frame section 21 decreases, the down frame weld seam 32 can be formed short in comparison with that of a conventional example. Besides, since the down frame weld seam 32 includes portions extending along side end portions of the connecting portion 54 which is comparatively long, the extension 55 can be formed shorter.

Further, by separating the main frame weld seam 30 and the down frame weld seam 32 from each other, a double bead can be prevented, and the welding quality can be improved.

Furthermore, since the down frame section 21 can be made shorter by formation of the lower extension 45, it can be formed in a straight shape by non-swaging working, and the number of working steps and the cost for the down frame section 21 can be reduced.

Besides, since the down frame weld seam 32 is formed only at a contacting portion between the connecting portion 54 and the upper end face 21a of the down frame section 21 and a contacting portion between the upper end lower face 21b of the down frame section 21 and the extension 55, while the structure of the down frame attachment portion 50 is simplified, a welding distance of a required length can be assured.

However, where this welding distance is compared with that of a conventional technology, it is shorter and facilitates fabrication.

Figure 7:
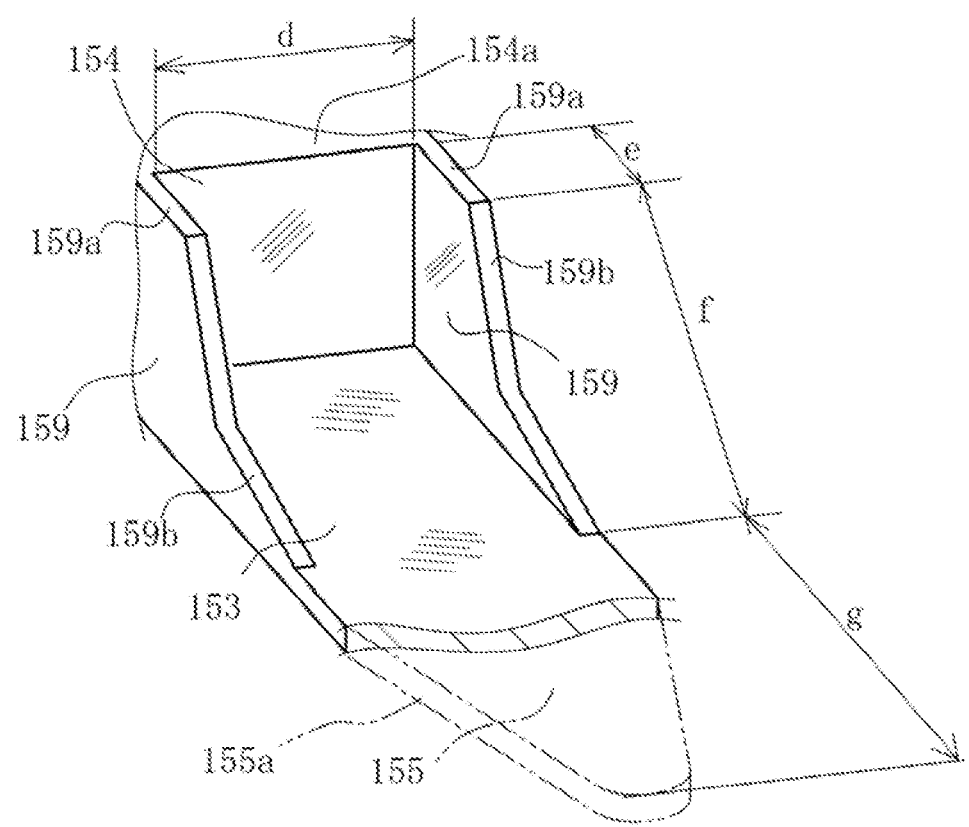
FIG. 7 is a perspective view schematically depicting a conventional down frame attachment portion.

In particular, where a down frame is welded in a neighboring relationship with the main frame attachment portion 44 like the conventional down frame 121 depicted in FIG. 3, the down frame 121 is formed in an insertion shape in which it is fitted with the fitting recessed portion depicted in FIG. 7.

FIG. 7 schematically depicts a conventional down frame attachment portion 150. The down frame attachment portion 150 has a fitting recessed portion of a channel-shaped cross sectional shape provided thereon. This fitting recessed portion has left and right side walls 159 and a lower side supporting portion 153. The lower side supporting portion 153 continues to an extension 155 which extends rearwardly longer than the side walls 159.

Further, the lower side supporting portion 153 and the side walls 159 are closed at a front end thereof with a connecting portion 154 but are open upwardly and rearwardly.

The welding is carried out in the leftward and rightward direction along an upper end 154a of the connecting portion 154, in the forward and rearward direction along an upper end portion 159a of the side walls 159, in the upward and downward direction along a rear end portion 159b of the side walls 159, and substantially in the forward and rearward direction along a periphery 155a of the extension 155.

Accordingly, the length of the weld seam in this case is configured from a length d along the upper end 154a of the connecting portion 154, lengths e along the upper end portions 159a of the side walls 159, lengths f along the rear end portions 159b of the side walls 159, and a length g along the periphery 155a of the extension 155 (e, f, and g are indicated only at one side).

Therefore, if the welding distances in FIGS. 6 and 7 are compared with each other, then if it is assumed that the lengths a and d and the lengths c and g are substantially equal to each other, then in the conventional example, the welding distances e in the forward and backward direction along the upper end portions 159a and the welding distances f in the obliquely upward and downward direction along the rear end portions 159b by the provision of the side walls 159 are apparently longer. Besides, since the extension 55 in the present invention can be made shorter than the extension 155 in the conventional example, actually the length c in the present invention is shorter than the length g in the conventional example. Accordingly, with the present invention, the welding distance can be reduced.

Further, in order to form the fitting recessed portion in FIG. 7, after forging, machining from the rear toward the front must be carried out to engrave the fitting recessed portion. Besides, it is necessary to engrave a lower portion of the main frame attachment portion 44 forwardly and tubularly, and this requires complicated working. Further, since the left and right side walls 159 are formed, mechanical working cannot be carried out from the leftward and rightward directions (Y direction) but must be carried out, for example, from the forward and rearward directions (X direction) or from the upward and downward directions (Z direction). Therefore, a great deal of working time is required, and besides big material waste is generated.

On the other hand, with the present invention, the mechanical working merely involves machining of the connecting portion side machining portion 56 and the extension side machining portion 57, which are slight excess material provided from the necessity for draft angles, from the left and right directions. Therefore, the mechanical working can be carried out easily and rapidly, and besides the material waste can be reduced. Besides, the mechanical working is minimized, and the machining time and the material cost for the formation materials can be reduced to achieve reduction of the cost.

Furthermore, since the material waste after forging is reduced, when an equal amount of formation material is used, the main body portion of the head pipe 11 can be increased in magnitude as much. Consequently, while the amount of the material to be used is maintained, the size can be increased.

Further, the superiority in forging by the present invention is described in detail. Referring to FIG. 3, an upper end foremost portion of the pipe portion 40 is represented as point P1; a rearmost end portion (rear end of the extension 55) of the pipe portion 40 as point P2; a crossing point between the straight line P1-P2 and the connecting portion 54 contacting with the front end portion of the down frame section 21 as point P3; a distance P1-P2 as overall distance A of the head pipe; a distance P3-P2 as distance B of the down frame attaching portion; and a distance P1-P3 as distance C of a great width portion. Here, the great width portion is a portion over which the width in the vehicle widthwise direction is relatively greater than the width of the extension 55. In particular, the lower side supporting portion 53, connecting portion 54 and so forth correspond to the increased width portion.

If the great width portion is increased like the distance C in this manner, then the volume of the material for forging can be increased to a portion in the proximity of the extension 55 at the rear end portion. As a result, also forging of the extension 55 neighboring with this great volume portion is facilitated, and therefore, it becomes easy to form the extension 55 by forging at a position spaced from the pipe portion 40 or the main frame attachment portion 44.

Besides, by making the distance C of the great width portion long, even if the formation material amount and the pressing tonnage are equal, a head pipe of a greater size can be formed by forging while it is expanded in the direction toward the down frame section 21. Further, as the distance C of the great width portion increases, the down frame section 21 can be reduced in length.

It is to be noted that a stiffener 36 indicated by an imaginary line in FIG. 2 is a reinforcing member which connects the down frame section 21 and the main frame section 20 to each other. However, in the present invention, since the down frame section 21 is reduced in length and the head pipe 11 is increased in strength, the stiffener 36 can be omitted.

However, if the stiffener 36 is provided, then the vehicle body strength can be increased.

Further, the present invention can be applied not only to the motorcycle described hereinabove but also to saddle-type vehicles of various type.

DESCRIPTION OF REFERENCE SYMBOLS

10: Vehicle body frame, 11: Head pipe, 20: Main frame, 21: Down frame, 30: Main frame weld seam, 32: Down frame weld seam, 40: Pipe portion, 44: Main frame attachment portion, 45: Lower extension, 50: Down frame attachment portion, 54: Connecting portion, 55: Extension Although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

What is claimed is:

1. A vehicle body frame for a saddle type vehicle, said vehicle body frame comprising:
   a head pipe for pivotally receiving a front fork therein which operatively supports a front wheel;
   a pair of left and right main frame sections connected to the head pipe and extending rearwardly in leftward and rightward directions; and
   a down frame section connected to the head pipe and extending downwardly therefrom;
   the head pipe including:
      a pipe portion,
      a main frame attachment portion to which the main frame sections are respectively welded at front end portions thereof such that part of the main frame sections overlap with the pipe portion, where a main frame weld seam is formed between each of the main frame sections and the main frame attachment portion;
      a downward extension connected directly to and extending downwardly from the main frame attachment portion; and
      a down frame attachment portion to which the down frame section is welded at an upper end portion thereof, the down frame attachment portion having a substantial L-shape as viewed from a side view thereof, the down frame attachment portion including a substantially flattened connecting portion,
   wherein a down frame weld seam is formed between the down frame section and the down frame attachment portion, the down frame attachment portion being provided at a lower rear portion of the downward extension, and wherein the down frame weld seam is spaced apart from the main frame weld seam, and the main frame weld seam does not intersect or cross over the down frame weld seam, as viewed in the side view of the vehicle body frame.

2. The vehicle body frame for the saddle type vehicle according to claim 1, wherein the down frame attachment portion is disposed rearwardly downwardly of the main frame attachment portion in a spaced relationship from the pipe portion and the main frame attachment portion.

3. The vehicle body frame for the saddle type vehicle according to claim 2, wherein
   the downward extension includes an upper side supporting portion extending rearwardly downwardly from a lower portion of the main frame attachment portion and a lower side supporting portion extending rearwardly downwardly from a lower portion of the pipe portion, and is formed integrally with the head pipe by forging, and
   the down frame attachment portion is configured from the connecting portion extending in parallel to the pipe portion from a lower end of the upper side supporting portion and connecting to the lower side supporting portion and an extension extending rearwardly from the lower side supporting portion farther than a lower end portion of the connecting portion.

4. The vehicle body frame for the saddle type vehicle according to claim 3, wherein the down frame section contacts and is welded at end faces at an upper end portion thereof with and to the connecting portion and the extension of the down frame attachment portion.

5. The vehicle body frame for the saddle type vehicle according to claim 1, wherein
   the downward extension includes an upper side supporting portion extending rearwardly downwardly from a lower portion of the main frame attachment portion and a lower side supporting portion extending rearwardly downwardly from a lower portion of the pipe portion, and is formed integrally with the head pipe by forging, and
   the down frame attachment portion is configured from the connecting portion extending in parallel to the pipe portion from a lower end of the upper side supporting portion and connecting to the lower side supporting portion and an extension extending rearwardly from the lower side supporting portion farther than a lower end portion of the connecting portion.

6. The vehicle body frame for the saddle type vehicle according to claim 5, wherein the down frame section contacts and is welded at end faces at an upper end portion thereof with and to the connecting portion and the extension of the down frame attachment portion.

7. The vehicle body frame for the saddle type vehicle according to claim 5, wherein the down frame attachment portion is formed by mechanical working in a vehicle widthwise direction so that each of a rear face of the connecting portion and an upper face of the extension is included in a plane which exhibits a straight line as viewed in side elevation.

8. The vehicle body frame for the saddle-type vehicle according to claim 1, wherein the main frame attachment portion overlaps at a front end portion thereof with the pipe portion, and is expanded beyond the pipe portion in a vehicle width direction; and wherein a cutout opening is provided extending through the main frame attachment portion in the vehicle width direction.

9. A saddle type vehicle comprising:
   a vehicle body frame;
   a front fork which rotatably supports a front wheel thereon;
   an engine which is operatively supported on the vehicle body frame; and
   a swing arm which is pivotally attached to a rear portion of the vehicle body frame and which rotatably supports a rear wheel thereon;
   wherein the vehicle body frame comprises:
   a head pipe for pivotally receiving a portion of the front fork therein;
   a pair of left and right main frame sections connected to the head pipe and extending rearwardly in leftward and rightward directions; and
   a down frame section connected to the head pipe and extending downwardly therefrom;

the head pipe including:
- a pipe portion,
- a main frame attachment portion to which the main frame sections are respectively welded at front end portions thereof such that part of the main frame sections overlap with the pipe portion, where a main frame weld seam is formed between each of the main frame sections and the main frame attachment portion,
- a downward extension connected directly to and extending downwardly from the main frame attachment portion; and
- a down frame attachment portion to which the down frame section is welded at an upper end portion thereof, the down frame attachment portion having a substantial L-shape as viewed from a side view thereof, the down frame attachment portion including a substantially flattened connecting portion,
  - wherein a down frame weld seam is formed between the down frame section and the down frame attachment portion, the down frame attachment portion being provided at a lower rear portion of the downward extension,
  - and wherein the down frame weld seam is spaced apart from the main frame weld seam, and the main frame weld seam does not intersect or cross over the down frame weld seam, as viewed in the side view of the vehicle body frame.

10. The saddle type vehicle according to claim 9, wherein the down frame attachment portion is disposed rearwardly downwardly of the main frame attachment portion in a spaced relationship from the pipe portion and the main frame attachment portion.

11. The saddle type vehicle according to claim 10, wherein
- the downward extension includes an upper side supporting portion extending rearwardly downwardly from a lower portion of the main frame attachment portion and a lower side supporting portion extending rearwardly downwardly from a lower portion of the pipe portion, and is formed integrally with the head pipe by forging, and
- the down frame attachment portion is configured from the connecting portion extending in parallel to the pipe portion from a lower end of the upper side supporting portion and connecting to the lower side supporting portion and an extension extending rearwardly from the lower side supporting portion farther than a lower end portion of the connecting portion.

12. The saddle type vehicle according to claim 11, wherein the down frame section contacts and is welded at end faces at an upper end portion thereof with and to the connecting portion and the extension of the down frame attachment portion.

13. The saddle type vehicle according to claim 9, wherein
- the downward extension includes an upper side supporting portion extending rearwardly downwardly from a lower portion of the main frame attachment portion and a lower side supporting portion extending rearwardly downwardly from a lower portion of the pipe portion, and is formed integrally with the head pipe by forging, and
- the down frame attachment portion is configured from the connecting portion extending in parallel to the pipe portion from a lower end of the upper side supporting portion and connecting to the lower side supporting portion and an extension extending rearwardly from the lower side supporting portion farther than a lower end portion of the connecting portion.

14. The saddle type vehicle according to claim 13, wherein the down frame section contacts and is welded at end faces at an upper end portion thereof with and to the connecting portion and the extension of the down frame attachment portion.

15. The saddle type vehicle according to claim 13, wherein the down frame attachment portion is formed by mechanical working in a vehicle widthwise direction so that each of a rear face of the connecting portion and an upper face of the extension is included in a plane which exhibits a straight line as viewed in side elevation.

16. The saddle-type vehicle according to claim 9, wherein the main frame attachment portion overlaps at a front end portion thereof with the pipe portion, and is expanded beyond the pipe portion in a vehicle width direction; and wherein a cutout opening is provided extending through the main frame attachment portion in the vehicle width direction.

* * * * *